June 12, 1951          C. R. KEENE          2,556,761
COMBINATION MICROMETER CALIPER AND DIAL GAUGE
Filed June 11, 1947
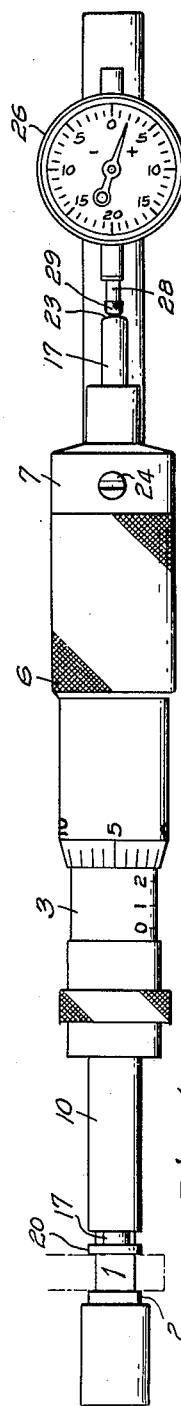
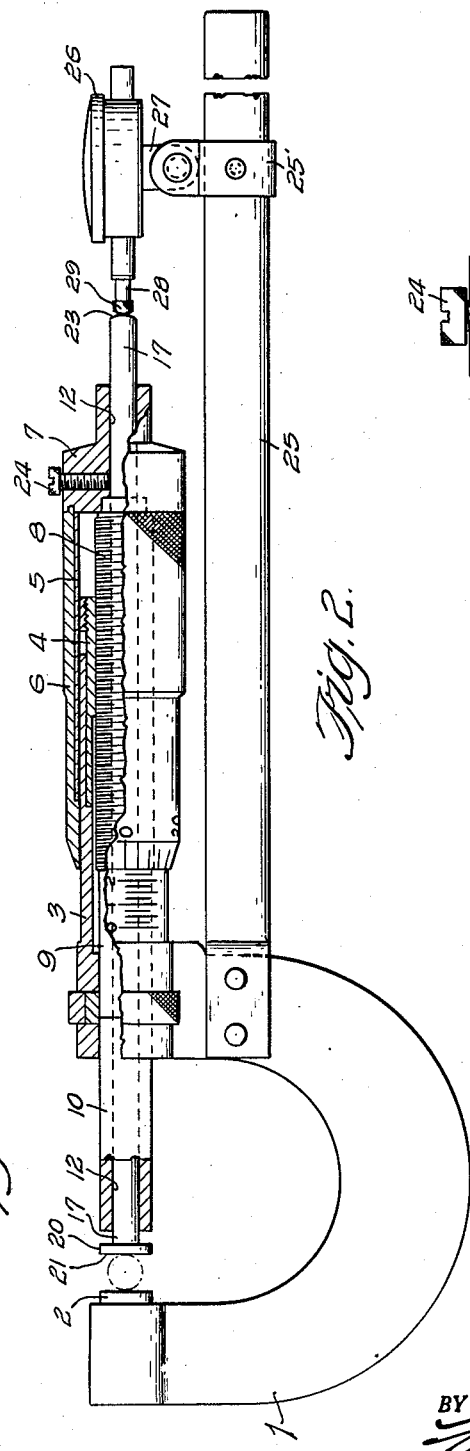
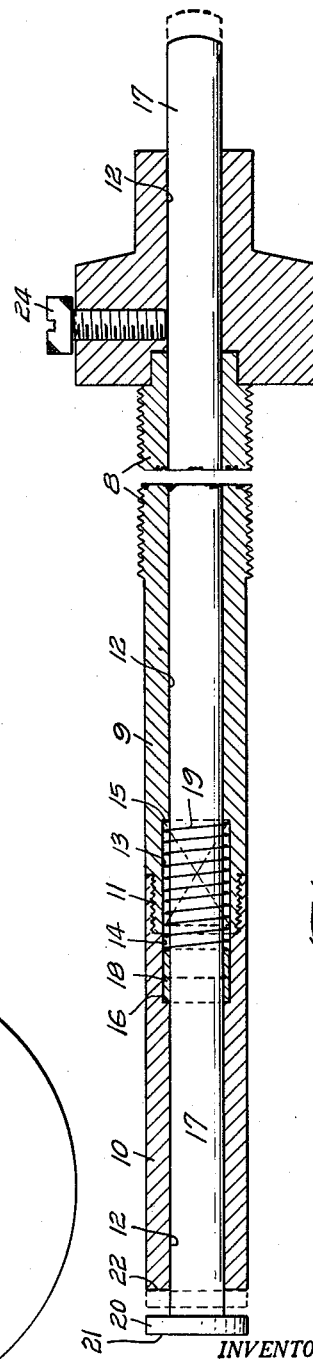
INVENTOR.
CECIL R. KEENE
BY
ATTORNEY.

Patented June 12, 1951

2,556,761

UNITED STATES PATENT OFFICE 2,556,761

COMBINATION MICROMETER CALIPER AND DIAL GAUGE

Cecil R. Keene, St. Louis, Mo.

Application June 11, 1947, Serial No. 753,880

2 Claims. (Cl. 33—147)

This invention relates to micrometer calipers, and more particularly to a combination micrometer caliper and dial gage.

The primary object of the present invention resides in the provision of a micrometer caliper that can be used either as a regular micrometer caliper, or as a micrometer operated dial gage to give plus and minus reading without the necessity of resetting the micrometer caliper where precision and tolerance are of absolute necessity.

A further object of the invention resides in the provision of an auxiliary slidably mounted spindle associated with the screw-threaded spindle sleeve and projecting from both ends thereof with the inner projecting end provided with an anvil suitably spaced from the inner end of the screw-threaded spindle sleeve.

A still further object of the invention resides in the provision of a screw-threaded spindle which is separable in advance of the screw-threaded portion thereof.

Standard or universal micrometer calipers, to my knowledge, cannot indicate plus and minus tolerances in one setting of the calipers, and, it is therefore, an object of my present invention is to provide a micrometer caliper with longitudinal means having an anvil mounted centrally of the micrometer caliper and a dial gage actuated by said means to indicate plus and minus readings on the dial gage with a single setting of the micrometer caliper.

A further object of the invention resides in the provision of a dial gage micrometer caliper for the purpose indicated that shall be simple and comparatively inexpensive in construction, sturdy, light in weight, and admirably adapted for the purpose intended without any inconvenience to the user thereof.

The embodiments of the invention herein disclosed are merely illustrative, and may be modified and departed from in various ways without departing from the spirit and scope of the invention, as pointed out hereinafter, and limited solely by the appended claims.

To the attainment of the above stated objects and others which will appear as the nature of the invention is better understood, the invention further resides in the novel features of construction, combination and association of parts, a practical embodiment of which is disclosed by the accompanying drawing.

Referring to the drawing:

Fig. 1 is a plan view of a measuring instrument embodying the features of my invention.

Fig. 2 is a view partly in side elevation and partly in sectional elevation of the invention.

Fig. 3 is a detail, with portions thereof broken away, showing the screw-threaded spindle sleeve and the spring controlled auxiliary spindle associated therewith.

In the drawing forming a part of this specification, and wherein like characters of reference denote similar parts throughout the several views, the reference character 1 designates the usual C-shaped frame of a micrometer caliper, which is provided with a suitable anvil 2. The reference character 3 designates the barrel of a micrometer caliper, while 4, 5, 6 and 7 designate the fixed nut, the thimble sleeve, the thimble, and the thimble cap, respectively.

The reference character 8 designates the accurate screw of a micrometer caliper which is screw-threadedly connected with the fixed nut 4, and revolved by the nut to vary the opening between opposed measuring faces, one of which is on the anvil 2, and the other which will be hereinafter described.

In carrying out my particular invention, I provide the micrometer screw 8 with a sectional sleeve comprising the spindle sleeve member 9 which is integral with the inner end of the screw 8, and the spindle sleeve member 10 which is screw-threadedly connected with the free end of the spindle sleeve member 9, as at 11.

The micrometer screw 8 and the spindle sleeves 9 and 10 and the thimble cap are provided with a bore 12 and adjacent ends of the spindle sections 9 and 10 are provided with aligned counterbores 13 and 14, respectively, providing internal shoulders or stops 15 and 16, respectively.

A vernier spindle 17 is mounted for longitudinal movement in the spindle, screw and cap bore 12. A sleeve 18 is secured to the spindle 17 and it is so located as to be mounted in the counterbore 14. A suitable coiled spring 19 is mounted on the vernier spindle 17 adjacent the outer face of the sleeve 18 so as to lie in the counterbore 13 with the inner end of the spring in contact with the outer end face of the sleeve 18 and the outer end of the spring in contact with the spindle shoulder or stop 15.

The inner end of the vernier spindle 17 projects beyond the inner end of the spindle sleeve member 10 and is provided with an anvil 20 having a measuring face 21. The outer face of the anvil is suitably spaced from the inner face 22 of the spindle sleeve member 10 such for illustration, as .0625 to .125, although the distance of the gap may be varied to suit the plus and minus tolerances to be gaged. The mean dimension to be measured is set between the anvil faces by turning the thimble and cap to actuate the screw 8 and the sectional sleeve members 9 and 10.

The usual graduations on the barrel 3 and the thimble 6 indicate precisely the position of the screw 8 and the amount of opening between the measuring surfaces. The thimble 6 rotates with the screw 8 and sectional spindle and travels along the barrel 3. The graduations on the barrel conform to the pitch of the measuring screw 8, one line for each revolution. The graduations on a beveled edge of the thimble accurately subdivide each revolution of the measuring screw 8 so that the readings may be taken in units of .001" or .01 mm. This refers solely to the micrometer caliper proper as they are now constructed.

The outer end of the vernier spindle 17 which acts as a dial gage actuating shaft projects beyond the thimble cap 7 and is provided with a contact face 23 having a spherical radius, and the thimble cap 7 is provided with a set vernier spindle lock in the nature of a suitable fastening device such, for instance, as a suitable screw 24 capable of being brought into and out of contact with the dial gage actuating shaft end of the vernier spindle 17.

A suitable supporting arm 25 is secured to and projects rearwardly from the C-shaped frame I so as to lie preferably, although not necessarily, parallel with the vernier spindle 17. The arm 25 projects beyond the thimble cap 7 and is designed to suitably support a suitable dial gage 26 which may be detachably secured thereto through the dial back connection 27.

The stem 28 of the dial gage 26 is provided with the desired contact point 29 which is adapted to make the necessary contact with the outer end of the vernier spindle 17, as clearly shown in Figs. 1 and 2.

The micrometer caliper as such, may, as is apparent, be used with or without the dial gage 26, but where close tolerances are to be held in measuring parts and it is not desired to rely solely on feel in adjusting the micrometer screw, the dial indicator gage is used which will accurately indicate the plus or minus dial readings without depending on feel alone, as is now the case in the use of micrometer calipers, and, it is well known that accurate readings are impossible as no two persons have the same feel in handling a micrometer caliper.

From the foregoing description, it will be understood that the micrometer caliper operated dial gage will give an accurate reading by merely slipping the measuring faces past the part to be measured and without relying on feel. It will measure outside diameters, long or short, large or small, and at various degrees the mean dimension with absolute precision with one setting of the thimble 6. It will indicate whether lathe work is being cut straight, or on a taper with one setting. The vernier spindle 17 will work with close but free tolerance and is held in place by the coiled spring 19, which has the same gaging tension at every gaging operation. The dial indicator gage can be locked in a set position for roughing work, thus the device may be used as a regular micrometer caliper without functioning of the dial indicator gage. Bearing surfaces, or crankshaft bearing surfaces for internal combustion motors can be gaged in very much less time for high and low dimensions off the mean dimensions, also out of round surfaces which would necessitate resetting a regular micrometer for various degree readings, high or low.

The device is designed not only for mere round, square, rectangular or flat work, but any work where absolute precision is required. My micrometer caliper operated dial indicator gage, as is clearly apparent, is not limited to any one specific type or class of work, but is of great necessity in production work in any class, where precision and close tolerances are of absolute requirement without delays occasioned by resetting of a regular micrometer caliper.

The above and many other advantages will readily suggest themselves to those skilled in the art to which the invention relates.

What I claim is:

1. A micrometer having, in combination, a separable tubular stem, the inner member of the separable tubular stem having a counterbore to provide an annular shoulder, the outer member of the separable tubular stem having a counterbore of the same diameter as the first mentioned counterbore and providing an annular shoulder, external screw threads on the outer member of the tubular stem, a spindle of uniform diameter throughout its length having an anvil on its inner end mounted for longitudinal movement in the separable tubular stem and projecting beyond both ends of the stem, a sleeve fixed to the spindle and receivable in the counterbore of the inner member of the separable tube stem, and a single coiled spring mounted on the spindle and positioned thereon between the sleeve fixed on the spindle and the annular shoulder in the outer member of the separable tubular stem.

2. A micrometer having, in combination, an outer sleeve and an inner rod, the outer sleeve including axially aligned tubular members screw threadedly connected at their adjacent ends, each tubular member having a counterbore at its said end providing thereby an annular shoulder for each counterbore, a sleeve fixed to the inner rod and receivable in the counterbore of one sleeve member, a single coiled spring encircling the inner rod, one end of said spring engaging the sleeve fixed on the inner rod, the opposite end of the spring engaging the annular shoulder in the other sleeve member, and a dial gage actuated by the outer end of the inner rod.

CECIL R. KEENE.

REFERENCES CITED

The following references are of record in the file of this patent:

UNITED STATES PATENTS

| Number | Name | Date |
|---|---|---|
| 1,305,872 | Bollie | June 3, 1919 |
| 1,561,630 | Wilson | Nov. 17, 1925 |
| 1,653,854 | Hoge | Dec. 27, 1927 |
| 2,073,089 | Autenreith | Mar. 9, 1937 |
| 2,304,460 | Kelleher | Dec. 8, 1942 |
| 2,316,877 | Maag | Apr. 20, 1943 |
| 2,344,498 | Coward | Mar. 21, 1944 |
| 2,344,595 | Calow et al. | Mar. 21, 1944 |
| 2,371,451 | Larson | Mar. 13, 1945 |
| 2,378,093 | Monies | June 12, 1945 |
| 2,385,157 | Nilsson et al. | Sept. 18, 1945 |

OTHER REFERENCES

Tool and Die Journal, page 58, Sept. 1947.